(12) United States Patent
Xu et al.

(10) Patent No.: US 11,914,639 B2
(45) Date of Patent: Feb. 27, 2024

(54) MULTIMEDIA RESOURCE MATCHING METHOD AND APPARATUS, STORAGE MEDIUM, AND ELECTRONIC APPARATUS

(71) Applicant: Tencent Technology (Shenzhen) Company Limited, Shenzhen (CN)

(72) Inventors: Xuyuan Xu, Shenzhen (CN); Guoping Gong, Shenzhen (CN); Tao Wu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 134 days.

(21) Appl. No.: 16/930,069

(22) Filed: Jul. 15, 2020

(65) Prior Publication Data

US 2020/0349385 A1    Nov. 5, 2020

Related U.S. Application Data

(63) Continuation of application No. PCT/CN2019/079988, filed on Mar. 28, 2019.

(30) Foreign Application Priority Data

Apr. 13, 2018  (CN) .......................... 201810333805.6

(51) Int. Cl.
*G06V 20/40* (2022.01)
*G06F 16/43* (2019.01)
(Continued)

(52) U.S. Cl.
CPC ............ *G06F 16/583* (2019.01); *G06F 16/43* (2019.01); *G06F 16/45* (2019.01); *G06F 18/214* (2023.01);
(Continued)

(58) Field of Classification Search
CPC .... G06V 10/40; G06K 9/6256; G06K 9/6267; G06K 9/6201; G06F 16/43; G06F 16/45; G06F 16/434
See application file for complete search history.

(56) References Cited

U.S. PATENT DOCUMENTS 9,659,014 B1    5/2017  Walters et al.
2014/0348433 A1*  11/2014  Zhu ........................ G06F 18/22
                                                                 382/217
(Continued)

FOREIGN PATENT DOCUMENTS

CN         103593464 B    *  2/2014
CN         103605773 A        2/2014
(Continued)

OTHER PUBLICATIONS

Tencent Technology, ISR, PCT/CN2019/079988, dated Jun. 25, 2019, 2 pgs.
(Continued)

*Primary Examiner* — Shaghayegh Azima
(74) *Attorney, Agent, or Firm* — Morgan, Lewis & Bockius LLP (57) ABSTRACT

This application discloses a multimedia resource matching method performed at a computing device. The method includes: searching a first media resource set among a multimedia resource set, first target image frames of all media resources in the first media resource set meeting a target condition, and features of the first target image frames matching features in image frames of a to-be-matched multimedia resource according to a first matching condition; determining, among the first target image frames, second target image frames whose features match the features in the image frames of the to-be-matched multimedia resource according to a second matching condition; and obtaining matching information of the second target image frames and
(Continued)

an identifier of a target media resource among the multimedia resource set, the matching information being used for indicating a total duration and a playback moment of the second target frame image in the target media resource.

20 Claims, 5 Drawing Sheets

(51) Int. Cl.
    *G06F 16/45*     (2019.01)
    *G06F 16/583*     (2019.01)
    *G06F 18/214*     (2023.01)
    *G06V 10/46*     (2022.01)

(52) U.S. Cl.
    CPC .............. *G06V 20/46* (2022.01); *G06V 20/48* (2022.01); *G06V 10/462* (2022.01)

(56) References Cited

U.S. PATENT DOCUMENTS

| | | | |
|---|---|---|---|
| 2015/0110340 A1* | 4/2015 | Harron | G06F 16/783 382/100 |
| 2016/0180379 A1* | 6/2016 | Salmon | G06Q 30/0255 705/14.53 |
| 2017/0024899 A1* | 1/2017 | Hammoud | G06V 10/758 |
| 2017/0277955 A1 | 9/2017 | Liu et al. | |
| 2019/0205393 A1* | 7/2019 | Wang | G06F 40/30 |
| 2022/0180622 A1* | 6/2022 | Zhang | G06V 10/776 |

FOREIGN PATENT DOCUMENTS

| | | | | |
|---|---|---|---|---|
| CN | 104504059 A | | 4/2015 | |
| CN | 105681898 A | | 6/2016 | |
| CN | 103593464 B | * | 2/2017 | ....... G06F 17/30784 |
| CN | 106844528 A | | 6/2017 | |
| CN | 107180074 A | | 9/2017 | |
| CN | 107291910 A | * | 10/2017 | |
| CN | 107291910 A | * | 10/2017 | ............. G06F 16/73 |
| CN | 107766571 A | | 3/2018 | |
| CN | 108647245 A | | 10/2018 | |
| WO | WO 2018010365 A1 | | 1/2018 | |

OTHER PUBLICATIONS

Alex Krizhevsky et al., "ImageNet Classification with Deep Convolutional Neural Networks", Advances In Neural Information Processing Systems (NIPS), Jan. 2, 2012, XP055637193, 9 pgs.

Extended European Search Report, EP19875786.5, dated Nov. 11, 2021, 9 pgs.

Man Hee Lee et al., "Performance Evaluation of Local Descriptors for Maximally Stable Extremal Regions", Journal of Visual Communication and Image Representation, Academic Press, Inc., vol. 47, May 22, 2017, XP085053214, ISSN: 1047-3203, 11 pgs.

Tencent Technology, WO, PCT/CN2019/079988, dated Jun. 25, 2019, 4 pgs.

Tencent Technology, IPRP, PCT/CN2019/079988, dated Oct. 13, 2020, 5 pgs.

Tencent Technology, European Office Action, EP Patent Application No. 19785786.5, dated Jun. 15, 2023, 11 pgs.

* cited by examiner

MULTIMEDIA RESOURCE MATCHING METHOD AND APPARATUS, STORAGE MEDIUM, AND ELECTRONIC APPARATUS

CROSS REFERENCE TO RELATED APPLICATIONS

This application is a continuation application of PCT Patent Application No. PCT/CN2019/079988, entitled "METHOD AND APPARATUS FOR MATCHING MULTIMEDIA RESOURCE, AND STORAGE MEDIUM AND ELECTRONIC DEVICE" filed on Mar. 28, 2019, which claims priority to Chinese Patent Application No. 201810333805.6, entitled "MULTIMEDIA RESOURCE MATCHING METHOD AND APPARATUS, STORAGE MEDIUM, AND ELECTRONIC APPARATUS" filed Apr. 13, 2018, all of which are incorporated by reference in their entirety.

FIELD OF THE TECHNOLOGY

This application relates to the field of computers, and specifically, to a multimedia resource matching method and apparatus, a storage medium, and an electronic apparatus.

BACKGROUND OF THE DISCLOSURE

With the rapid development of computer and network technologies, people can access an increasing quantity of multimedia resources on networks. Platforms providing multimedia resources sometimes need to perform matching on the multimedia resources, to perform subsequent processing on the multimedia resources. However, a current manner of matching multimedia resources has relatively low accuracy and relatively low matching efficiency. How to perform matching on multimedia resources with high accuracy and high efficiency becomes a key part of improving efficiency in processing the multimedia resources.

For the foregoing problem, currently no effective solutions have been put forward.

SUMMARY

Embodiments of this application provide a multimedia resource matching method and apparatus, a storage medium, and an electronic apparatus, to resolve at least a technical problem of relatively low efficiency of matching multimedia resources in the related art.

According to an aspect of the embodiments of this application, a multimedia resource matching method is provided. The method includes: searching a first media resource set among a multimedia resource set, first target image frames of all media resources in the first media resource set meeting a target condition, and features of the first target image frames matching features in image frames of a to-be-matched multimedia resource according to a first matching condition; determining, among the first target image frames, second target image frames whose features match the features in the image frames of the to-be-matched multimedia resource according to a second matching condition; and obtaining matching information of the second target image frames and an identifier of a target media resource among the multimedia resource set, the matching information being used for indicating a total duration and a playback moment of the second target frame image in the target media resource.

Optionally, in this embodiment, the multimedia resource matching method is applied to a target device.

Optionally, in this embodiment, the target device includes: a terminal device or a server device.

According to another aspect of the embodiments of this application, a non-transitory computer-readable storage medium stores at least one instruction, the instruction being loaded and executed by a processor of a computing device and causing the computing device to perform the foregoing multimedia resource matching method.

According to another aspect of the embodiments of this application, a computing device is further provided. The computing device includes memory and a processor, the memory storing a plurality of programs that, when executed by the processor, cause the computing device to perform the foregoing multimedia resource matching method.

In the embodiments of this application, media resources in which features of included first target image frames match features of image frames of a to-be-matched multimedia resource and meet a first matching condition, and the first target image frames meet a target condition are first found from a multimedia resource set, to find media resources in a resource library that are similar to the to-be-matched multimedia resource, to form a first media resource set; then second target image frames whose features match the features in the image frames of the to-be-matched multimedia resource and meet a second matching condition are determined from the first target image frames of the media resources in the first media resource set; and matching information of the second target image frames is obtained, to sift out media resources having higher similarities from the media resources similar to the to-be-matched multimedia resource, and obtain specific matching information, thereby improving efficiency of matching multimedia resources, and further resolving a technical problem of relatively low efficiency of matching multimedia resources in the related art.

BRIEF DESCRIPTION OF THE DRAWINGS

The accompanying drawings described herein are used for providing a further understanding of this application, and form a part of this application. Exemplary embodiments of this application and descriptions thereof are used for explaining this application, and do not constitute any inappropriate limitation to this application. In the accompanying drawings.

DESCRIPTION OF EMBODIMENTS

To make a person skilled in the art understand solutions of this application better, the following clearly and completely describes the technical solutions in the embodiments of this application with reference to the accompanying drawings in the embodiments of this application. Apparently, the described embodiments are merely some but not all of the embodiments of this application. All other embodiments obtained by a person of ordinary skill in the art based on the embodiments of this application without creative efforts shall fall within the protection scope of this application.

The terms such as "first" and "second" in the specification, claims, and accompanying drawings of this application are intended to distinguish between similar objects rather than describe a particular sequence or a chronological order. It is to be understood that the data termed in such a way are interchangeable in proper circumstances so that the embodiments of this application described herein can be implemented in orders except the order illustrated or described herein. In addition, the terms "include", "comprise" and any other variants are intended to cover the non-exclusive inclusion. For example, a process, method, system, product, or device that includes a series of steps or units is not necessarily limited to those expressly listed steps or units, but may include other steps or units not expressly listed or inherent to such a process, method, product, or device.

Figure 1:
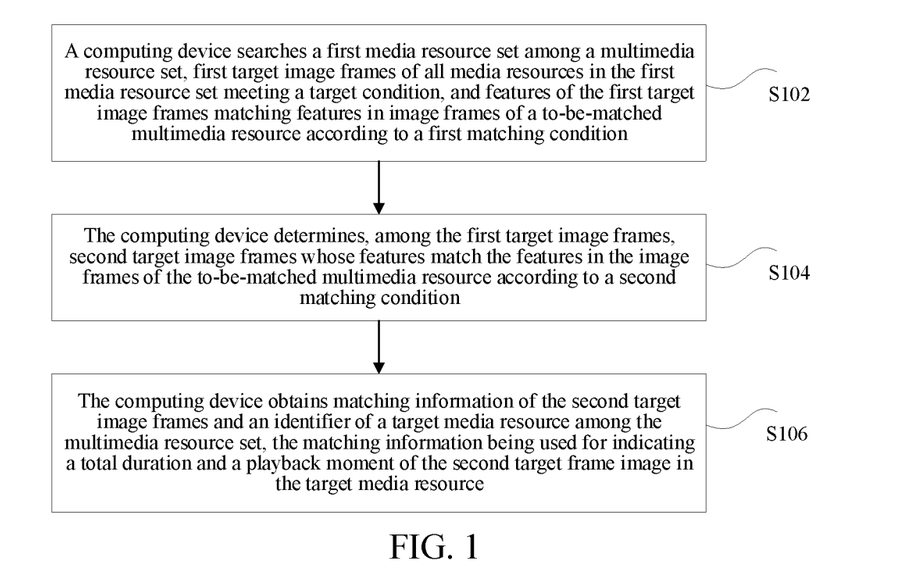
FIG. 1 is a schematic diagram of an optional multimedia resource matching method according to an embodiment of this application.

According to an aspect of the embodiments of this application, a multimedia resource matching method is provided. As shown in FIG. 1, the method includes the following steps:

S102: A computing device searches a first media resource set among a multimedia resource set, first target image frames of all media resources in the first media resource set meeting a target condition, and features of the first target image frames matching features in image frames of a to-be-matched multimedia resource according to a first matching condition.

S104: The computing device determines, among the first target image frames, second target image frames whose features match the features in the image frames of the to-be-matched multimedia resource according to a second matching condition.

S106: The computing device obtains matching information of the second target image frames and an identifier of a target media resource among the multimedia resource set, the matching information being used for indicating a total duration and a playback moment of the second target frame image in the target media resource.

Figure 2:
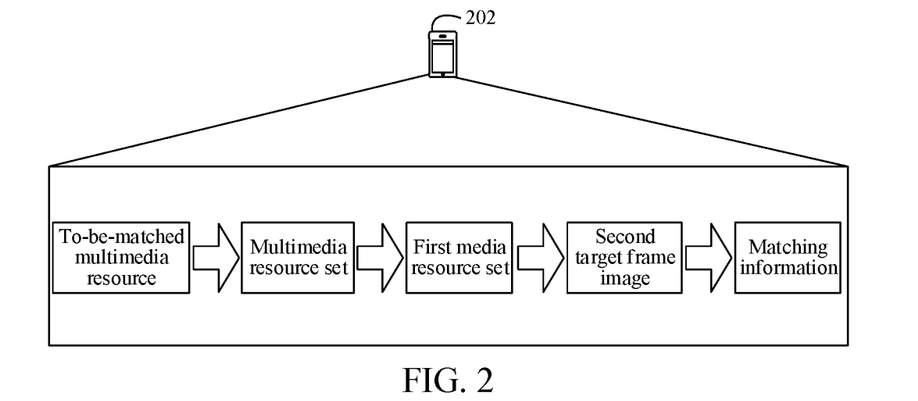
FIG. 2 is a schematic diagram of an application environment of an optional multimedia resource matching method according to an embodiment of this application.

Optionally, in this embodiment, the multimedia resource matching method may be applied to a hardware environment constituted by a target device 202 shown in FIG. 2. As shown in FIG. 2, the target device 202 searches a multimedia resource set for a first media resource set, first target image frames of all media resources in the first media resource set meeting a target condition, and features of the first target image frames matching features in image frames of a to-be-matched multimedia resource and meeting a first matching condition. The target device 202 determines second target image frames in the first target image frames, features of the second target image frames matching the features in the image frames of the to-be-matched multimedia resource and meeting a second matching condition. The target device 202 obtains matching information of the second target image frames, the matching information being used for indicating a total duration and a playback moment of the second target frame image in a target media resource.

Optionally, in this embodiment, the target device 202 may be, but is not limited to, a terminal device, or may be, but is not limited to, a server device, for example, a terminal device on which a client supporting multimedia can be installed, such as a mobile phone, a tablet computer, or a personal computer (PC). Alternatively, the target device 202 may be a server corresponding to a client supporting multimedia. The foregoing description is merely an example, and no limitation is imposed in this embodiment.

Optionally, in this embodiment, the multimedia resource matching method may be applied to, but is not limited to, a scenario in which multimedia resources are matched. The client may be, but is not limited to, various types of applications, for example, an online education application, an instant messaging application, a community space application, a game application, a shopping application, a browser application, a financial application, a multimedia application (such as a video application and an audio application), and a live streaming application. Optionally, the multimedia resource matching method may be applied to, but is not limited to, a scenario in which video resources are matched in the foregoing video application, or may be applied to, but is not limited to, a scenario in which audio resources are matched in the foregoing instant messaging application, to improve efficiency of matching multimedia resources. The foregoing description is merely an example, and no limitation is imposed in this embodiment.

Optionally, in this embodiment, the multimedia resources may include, but are not limited to: video resources (video files, video streams, and the like), audio resources (audio files, audio streams, and the like), picture resources (animated pictures, sound pictures, and the like), text resources, and the like.

Optionally, in this embodiment, the target condition that the first target image frames of all the media resources in the first media resource set need to meet may be, but is not limited to, a condition used for determining a similarity between two multimedia resources. For example, a quantity of first target image frames in a multimedia resource is greater than a first quantity, a proportion of first target image frames of a multimedia resource in the multimedia resource is greater than a first proportion, a quantity of temporally consecutive first target image frames in a multimedia resource is greater than a second quantity, or a proportion of the quantity of the consecutive first target image frames in the multimedia resource is greater than a second proportion.

Optionally, in this embodiment, the first matching condition that the features of the first target image frames need to meet may include, but is not limited to, that the first target image frames and the image frames of the to-be-matched multimedia resource have same first-type features. For example, one or more of the first-type features can be extracted from each frame image. For example, the first-type features may be features extracted through deep learning. When all or some of first-type features respectively extracted from two image frames are the same, the two image frames can be determined to be similar.

Optionally, in this embodiment, the second matching condition that the features of the second target image frames and the features in the image frames of the to-be-matched multimedia resource need to meet may include, but is not limited to, that a quantity of same or similar features in second-type features extracted from the second target image frames and second-type features extracted from the image frames of the to-be-matched multimedia resource is greater than a target value, or a proportion of the quantity of the same or similar features in a total quantity of the second-type features extracted from the second target image frames and the second-type features extracted from the image frames of the to-be-matched multimedia resource is greater than a specific value. For example, second-type features may be extracted from a frame image by using a feature extraction algorithm (such as a scale-invariant feature transform (SIFT for short) algorithm or a speeded up robust features (SURF for short) algorithm). If same or similar second-type features in two image frames reach a specific quantity, the two image frames may be considered as same image frames.

Optionally, in this embodiment, the matching information of the second target frame image may include, but is not limited to: a total duration and a playback moment of the second target frame image in a target media resource. Alternatively, the matching information may further include, but is not limited to: a scaling relationship of matched segments between the target media resource and the to-be-matched multimedia resource, a percentage that the total duration of the second target frame image in the target media resource accounts for in a duration of the target media resource, and the like.

Optionally, in this embodiment, after the matching information of the second target image frames is obtained, the matching information may be used for processing the to-be-matched multimedia resource, for example, determining whether the resource infringes on a copyright, pushing a multimedia resource, and performing typesetting on a multimedia resource on an interface.

Figure 3:
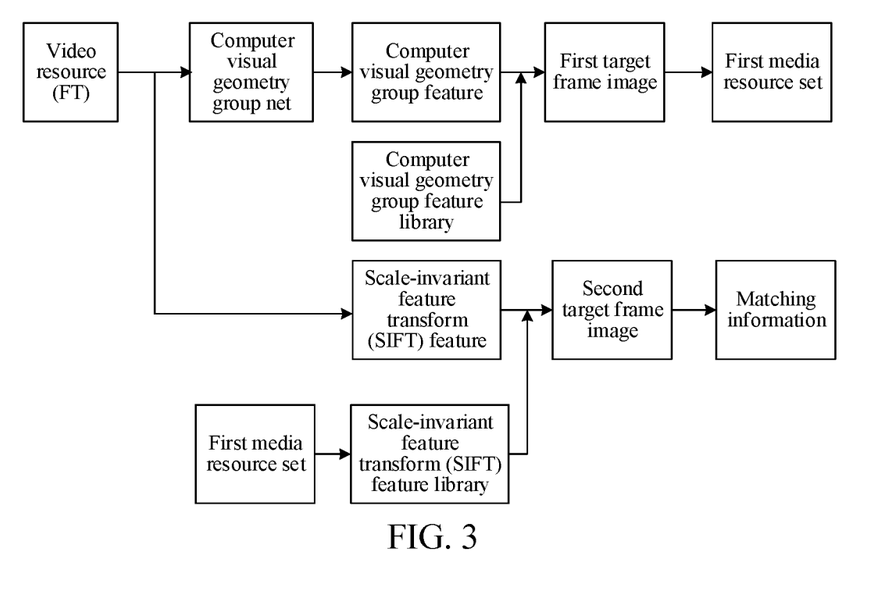
FIG. 3 is a schematic diagram of an optional multimedia resource matching method according to an optional implementation of this application.

In an optional implementation, a video resource is used as an example. As shown in FIG. 3, a to-be-matched video resource (FT) is inputted into a deep learning network (for example, a computer visual geometry group net (VGGNet for short)). VGG features of all frames in the FT are extracted; the VGG features are matched with VGG features of image frames of multimedia resources in a multimedia resource set, to sift out first target image frames having the VGG features in the multimedia resource set. Multimedia resources to which the first target image frames belong are determined as media resources in the first media resource set. SIFT features are extracted then from the image frames of the to-be-matched multimedia resource, and the SIFT features in the image frames of the to-be-matched multimedia resource are matched with SIFT features in the first target image frames. Successfully matched image frames in the first target image frames are determined as second target image frames, and matching information of the second target image frames is obtained.

It can be learned that through the foregoing steps, media resources in which features of included first target image frames match features of image frames of a to-be-matched multimedia resource and meet a first matching condition, and the first target image frames meet a target condition are first found from a multimedia resource set, to find media resources in a resource library that are similar to the to-be-matched multimedia resource, to form a first media resource set; then second target image frames whose features match the features in the image frames of the to-be-matched multimedia resource and meet a second matching condition are determined from the first target image frames of the media resources in the first media resource set; and matching information of the second target image frames is obtained, to sift out media resources having higher similarities from the media resources similar to the to-be-matched multimedia resource, and obtain specific matching information, thereby improving efficiency of matching multimedia resources, and further resolving a technical problem of relatively low efficiency of matching multimedia resources in the related art.

In an optional solution, that the target device searches the multimedia resource set for the first media resource set includes the following steps:

S1: The target device determines, in image frames of multimedia resources in the multimedia resource set, the first target image frames meeting the target condition.

S2: The target device obtains first multimedia resources to which the first target image frames belong, the first media resource set including the first multimedia resources.

Optionally, in this embodiment, a storage form in the multimedia resource set may be, but is not limited to, a feature-frame image pair form. The image frames may be represented in a form of coordinates of multimedia resource identifiers and playback time points, for example, $[D_t]$: $\{[t_j, videoID_k], [t_k, videoID_x] \ldots \}$ and $[D_{t+1}]$: $\{[t_{j+n}, videoID_{k+h}], [t_k, videoID_x] \ldots \}$, where $D_t$ and $D_{t+1}$ are features, t is a time point, and videoID is an ID number of a video. A specific frame image of a specific multimedia resource in the first multimedia resource set having features the same as or similar to those of the image frames of the to-be-matched multimedia resource can be sifted out in this form.

Optionally, in this embodiment, after the first target image frames meeting the target condition are obtained, the first target image frames may be aggregated according to multimedia resources, to find the first multimedia resources to which the first target image frames belong. Therefore, the first media resource set is obtained.

In an optional solution, that the target device determines, in image frames of multimedia resources in the multimedia resource set, the first target image frames meeting the target condition includes the following steps:

S1: The target device extracts a first feature from the image frames of the to-be-matched multimedia resource.

S2: The target device obtains, from features and frame image sets that have correspondences, a target frame image set corresponding to the first feature, the target frame image set including image frames that are in multimedia resources of the first media resource set and that have the first feature, features of the image frames in the target frame image set matching the features in the image frames of the to-be-matched multimedia resource and meeting the first matching condition.

S3: The target device obtains a second multimedia resource to which the image frames in the target frame image set belong.

S4: The target device obtains a quantity of consecutive image frames that have the first feature and that are in the second multimedia resource.

S5: The target device determines image frames having the first feature in the second multimedia resource whose quantity of consecutive image frames having the first feature falls within a target quantity threshold range as the first target image frames meeting the target condition.

S6: The target device determines the media resources to which the first target image frames meeting the target condition belong as the first media resource set.

Optionally, in this embodiment, the first feature in the image frames of the to-be-matched multimedia resource may be extracted in the following manner: training a classification network model by using a plurality of multimedia resource samples and similarity data, to obtain a target classification network model, the similarity data being data used for indicating similarities among the plurality of multimedia resource samples, a loss function of the classification network model being set to a contrastive loss function, input parameters of the target classification network model being image frames of multimedia resources, and output parameters of the target classification network model being features corresponding to the image frames of the multimedia resources; and inputting the image frames of the to-be-matched multimedia resource into the target classification network model, to obtain the first feature outputted by the target classification network model.

Optionally, in this embodiment, the classification network model may include, but is not limited to: the VGGNet, the GoogleNet, the ResNet, and the like.

In an optional solution, that the target device determines the second target image frames in the first target image frames includes the following steps:

S1: The target device extracts second features from the first target image frames, and extracting third features from the image frames of the to-be-matched multimedia resource.

S2: The target device obtains correspondences between the first target image frames and the image frames of the to-be-matched multimedia resource.

S3: For the first target frame image and the frame image of the to-be-matched multimedia resource that have the correspondence, the target device obtains a quantity of matched features and a quantity of mutually unmatched features in the second features of the first target frame image and the third features of the frame image of the to-be-matched multimedia resource.

S4: The target device obtains a ratio of the quantity of the matched features to the quantity of the mutually unmatched features.

S5: The target device determines the first target frame image corresponding to the ratio falling within a first ratio range as the second target frame image, the frame image corresponding to the ratio falling within the first ratio range being a frame image whose features match the features in the frame image of the to-be-matched multimedia resource and meet the second matching condition.

Figure 4:
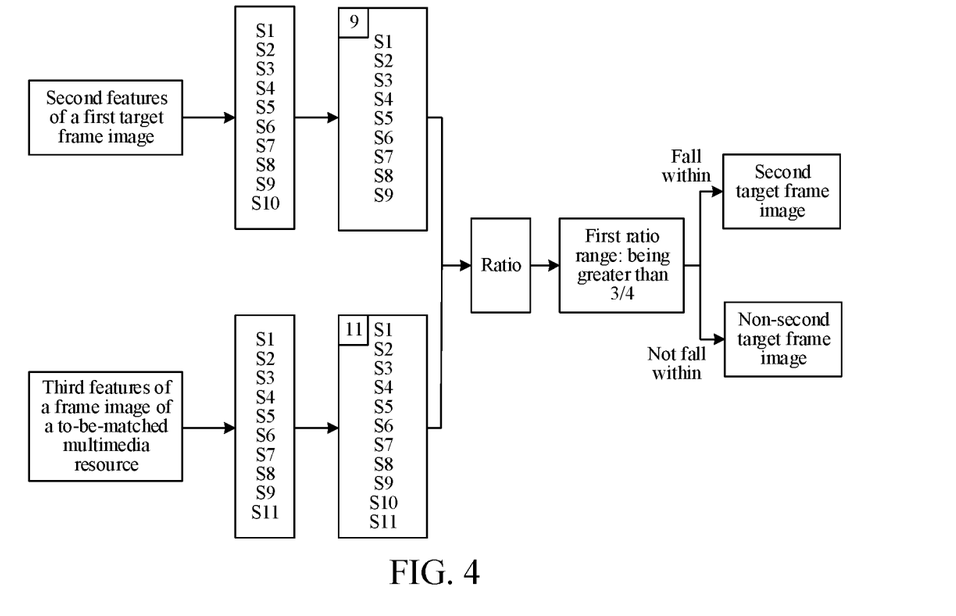
FIG. 4 is a schematic diagram of an optional multimedia resource matching method according to an optional implementation of this application.

In an optional implementation, as shown in FIG. 4, for a first target frame image and a frame image of the to-be-matched multimedia resource that have a correspondence, if second features of the first target frame image include: S1, S2, S3, S4, S5, S6, S7, S8, S9, and S10, and third features of the frame image of the to-be-matched multimedia resource include: S1, S2, S3, S4, S5, S6, S7, S8, S9, and S11, matched features between the second features of the first target frame image and the third features of the frame image of the to-be-matched multimedia resource are S1, S2, S3, S4, S5, S6, S7, S8, and S9, and a quantity of the matched features is 9; mutually unmatched features between the second features of the first target frame image and the third features of the frame image of the to-be-matched multimedia resource are S1, S2, S3, S4, S5, S6, S7, S8, S9, S10, and S11, and a quantity of mutually unmatched features is 11, so that a ratio of the quantity of the matched features to the quantity of the mutually unmatched features is 9/11. Assuming that the first ratio range is being greater than 3/4, and the ratio 9/11 is greater than 3/4, then the first target frame image can be determined as a second target frame image.

In an optional solution, that the target device obtains the matching information of the second target image frames includes the following steps:

S1: The target device obtains target media resources to which the second target image frames belong.

S2: For each of the target media resources, the target device determines a quantity of second target image frames included in the target media resource and a frame rate value of the target media resource, the frame rate value being used for indicating a quantity of played image frames per second of the target media resource.

S3: The target device determines a product of the quantity of the second target image frames included in the target media resource and the frame rate value of the target media resource as a total duration corresponding to the target media resource, and determines a playback time point of the second target image frames included in the target media resource in the target media resource as a playback moment corresponding to the target media resource.

Optionally, in this embodiment, a total duration of a matching part between the to-be-matched multimedia resource and a multimedia resource can be determined by using, for example, but not limited to, a quantity of second target image frames in the multimedia resource and a frame rate value of the multimedia resource.

Optionally, in this embodiment, a scaling relationship of matched parts in a multimedia resource is determined by, for example, but not limited to, constructing a mapping relationship between time points of a second target frame image and a to-be-matched frame image that have a correspondence. For example, a scaling relationship on a video matching time domain is estimated by constructing a time point mapping relationship of at1+bt2=c (t1 is a time point of an inputted video, and t2 is a time point of a matched video). Information of video time domain deformation is estimated by using a least squares error method.

In an optional solution, after the target device obtains the matching information of the second target image frames, the method further includes the following steps:

S1: The target device obtains a ratio of the total duration to a duration of the target media resource.

S2: The target device determines, in a case that the ratio of the total duration to the duration of the target media resource falls within a second ratio range, that the to-be-matched multimedia resource infringes on a copyright of the target media resource, the target media resource being a multimedia resource having a copyright.

Optionally, in this embodiment, whether the to-be-matched multimedia resource infringes on a copyright may be determined according to the obtained matching information. For example, if a duration of a matching part between a to-be-matched video and a video in a video library exceeds 50% of a total duration of the video, it may be determined that the to-be-matched video infringes on a copyright of the video.

For brief description, the foregoing method embodiments are represented as a series of action combinations. However, a person skilled in the art shall appreciate that this application is not limited to the described order of the actions, because some steps may be performed in other orders or simultaneously according to this application. In addition, a person skilled in the art shall also learn that all the embodiments described in the specification are exemplary embodiments, and the related actions and modules are not necessarily mandatory to this application.

According to the foregoing descriptions of implementations, a person skilled in the art may clearly learn that the method according to the foregoing embodiments may be implemented by using software and a necessary general hardware platform, or certainly may be implemented by using hardware. However, in most cases, the former is a better implementation. Based on such an understanding, the technical solutions of this application essentially or the part contributing to a related art may be implemented in a form of a software product. The computer software product is stored in a storage medium (such as a read-only memory (ROM)/random access memory (RAM), a magnetic disk, or an optical disc), and includes several instructions for instructing a terminal device (which may be a mobile phone, a computer, a server, a network device, or the like) to perform the methods described in the embodiments of this application.

Figure 5:
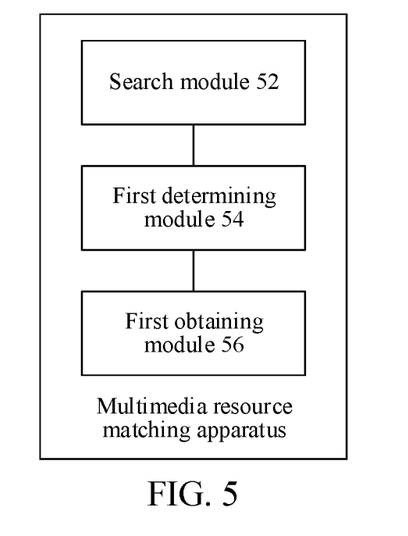
FIG. 5 is a schematic diagram of an optional multimedia resource matching apparatus according to an embodiment of this application.

According to another aspect of the embodiments of this application, a multimedia resource matching apparatus configured to implement the foregoing multimedia resource matching method is further provided. As shown in FIG. 5, the apparatus includes:

(1) a search module 52, configured to search a multimedia resource set for a first media resource set, first target image frames of all media resources in the first media resource set meeting a target condition, and features of the first target image frames matching features in image frames of a to-be-matched multimedia resource and meeting a first matching condition;

(2) a first determining module 54, configured to determine second target image frames in the first target image frames, features of the second target image frames matching the features in the image frames of the to-be-matched multimedia resource and meeting a second matching condition; and (3) a first obtaining module 56, configured to obtain matching information of the second target image frames, the matching information being used for indicating a total duration and a playback moment of the second target frame image in a target media resource, and the target media resource being a media resource to which the second target frame image belongs.

Optionally, in this embodiment, the multimedia resource matching apparatus may be applied to a hardware environment constituted by a target device 202 shown in FIG. 2. As shown in FIG. 2, the target device 202 searches a multimedia resource set for a first media resource set, first target image frames of all media resources in the first media resource set meeting a target condition, and features of the first target image frames matching features in image frames of a to-be-matched multimedia resource and meeting a first matching condition. Second target image frames are determined in the first target image frames, features of the second target image frames matching the features in the image frames of the to-be-matched multimedia resource and meeting a second matching condition. Matching information of the second target image frames is obtained, the matching information being used for indicating a total duration and a playback moment of the second target frame image in a target media resource.

Optionally, in this embodiment, the target device 202 may be, but is not limited to, a terminal device, or may be, but is not limited to, a server device, for example, a terminal device on which a client supporting multimedia can be installed, such as a mobile phone, a tablet computer, or a PC. Alternatively, the target device 202 may be a server corresponding to a client supporting multimedia. The foregoing description is merely an example, and no limitation is imposed in this embodiment.

Optionally, in this embodiment, the multimedia resource matching apparatus may be applied to, but is not limited to, a scenario of performing matching on multimedia resources. The client may be, but is not limited to, various types of applications, for example, an online education application, an instant messaging application, a community space application, a game application, a shopping application, a browser application, a financial application, a multimedia application (such as a video application and an audio application), and a live streaming application. Optionally, the multimedia resource matching method may be applied to, but is not limited to, a scenario in which video resources are matched in the foregoing video application, or may be applied to, but is not limited to, a scenario in which audio resources are matched in the foregoing instant messaging application, to improve efficiency of matching multimedia resources. The foregoing description is merely an example, and no limitation is imposed in this embodiment.

Optionally, in this embodiment, the multimedia resources may include, but are not limited to: video resources (video files, video streams, and the like), audio resources (audio files, audio streams, and the like), picture resources (animated pictures, sound pictures, and the like), text resources, and the like.

Optionally, in this embodiment, the target condition that the first target image frames of all the media resources in the first media resource set need to meet may be, but is not limited to, a condition used for determining a similarity between two multimedia resources. For example, a quantity of first target image frames in a multimedia resource is greater than a first quantity, a proportion of first target image frames of a multimedia resource in the multimedia resource is greater than a first proportion, a quantity of temporally consecutive first target image frames in a multimedia resource is greater than a second quantity, or a proportion of the quantity of the consecutive first target image frames in the multimedia resource is greater than a second proportion.

Optionally, in this embodiment, the first matching condition that the features of the first target image frames need to meet may include, but is not limited to, that the first target image frames and the image frames of the to-be-matched multimedia resource have same first-type features. For example, one or more of the first-type features can be extracted from each frame image. For example, the first-type features may be features extracted through deep learning. When all or some of first-type features respectively extracted from two image frames are the same, the two image frames can be determined to be similar.

Optionally, in this embodiment, the second matching condition that the features of the second target image frames and the features in the image frames of the to-be-matched multimedia resource need to meet may include, but is not limited to, that a quantity of same or similar features in second-type features extracted from the second target image frames and second-type features extracted from the image frames of the to-be-matched multimedia resource is greater than a target value, or a proportion of the quantity of the same or similar features in a total quantity of the second-type features extracted from the second target image frames and the second-type features extracted from the image frames of the to-be-matched multimedia resource is greater than a specific value. For example, second-type features may be extracted from a frame image by using a feature extraction algorithm (such as a SIFT algorithm or a SURF algorithm). If same or similar second-type features in two image frames reach a particular quantity, it may be considered that the two image frames are same image frames.

Optionally, in this embodiment, the matching information of the second target frame image may include, but is not limited to: a total duration and a playback moment of the second target frame image in a target media resource. Alternatively, the matching information may further include, but is not limited to: a scaling relationship of matched segments between the target media resource and the to-be-matched multimedia resource, a percentage that the total duration of the second target frame image in the target media resource accounts for in a duration of the target media resource, and the like.

Optionally, in this embodiment, after the matching information of the second target image frames is obtained, the matching information may be used for processing the to-be-matched multimedia resource, for example, determining whether the resource infringes on a copyright, pushing a multimedia resource, and performing typesetting on a multimedia resource on an interface.

In an optional implementation, a video resource is used as an example. A to-be-matched video resource FT is inputted into a deep learning network (for example, the VGGNet). VGG features of all frames in the FT are extracted. The VGG features are matched with VGG features of image frames of multimedia resources in a multimedia resource set, to sift out first target image frames having the VGG features in the multimedia resource set. Multimedia resources to which the first target image frames belong are determined as media resources in the first media resource set. SIFT features are extracted then from the image frames of the to-be-matched multimedia resource, and the SIFT features in the image frames of the to-be-matched multimedia resource are matched with SIFT features in the first target image frames. Successfully matched image frames in the first target image frames are determined as second target image frames, and matching information of the second target image frames is obtained.

It can be learned that by using the apparatus described above, media resources in which features of included first target image frames match features of image frames of a to-be-matched multimedia resource and meet a first matching condition, and the first target image frames meet a target condition are first found from a multimedia resource set, to find media resources in a resource library that are similar to the to-be-matched multimedia resource, to form a first media resource set; then second target image frames whose features match the features in the image frames of the to-be-matched multimedia resource and meet a second matching condition are determined from the first target image frames of the media resources in the first media resource set; and matching information of the second target image frames is obtained, to sift out media resources having higher similarities from the media resources similar to the to-be-matched multimedia resource, and obtain specific matching information, thereby improving efficiency of matching multimedia resources, and further resolving a technical problem of relatively low efficiency of matching multimedia resources in the related art.

In an optional solution, the search module includes:
(1) a first determining unit, configured to determine, in image frames of multimedia resources in the multimedia resource set, the first target image frames meeting the target condition; and
(2) a first obtaining unit, configured to obtain first multimedia resources to which the first target image frames belong, the first media resource set including the first multimedia resources.

Optionally, in this embodiment, a storage form in the multimedia resource set may be, but is not limited to, a feature-frame image pair form. The image frames may be represented in a form of coordinates of multimedia resource identifiers and playback time points, for example, $[D_t]$: $\{[t_j, videoID_k], [t_k, videoID_x] \ldots \}$ and $[D_{t+1}]$: $\{[t_{j+n}, videoID_{k+h}], [t_k, videoID_x] \ldots \}$, where $D_t$ and $D_{t+1}$ are features, t is a time point, and videoID is an ID number of a video. A specific frame image of a specific multimedia resource in the first multimedia resource set having features the same as or similar to those of the image frames of the to-be-matched multimedia resource can be sifted out in this form.

Optionally, in this embodiment, after the first target image frames meeting the target condition are obtained, the first target image frames may be aggregated according to multimedia resources, to find the first multimedia resources to which the first target image frames belong. Therefore, the first media resource set is obtained.

In an optional solution, the first determining unit is configured to:

extract a first feature from the image frames of the to-be-matched multimedia resource;

obtain, from features and frame image sets that have correspondences, a target frame image set corresponding to the first feature, the target frame image set including image frames that are in multimedia resources of the first media resource set and that have the first feature, features of the image frames in the target frame image set matching the features in the image frames of the to-be-matched multimedia resource and meeting the first matching condition;

obtain a second multimedia resource to which the image frames in the target frame image set belong;

obtain a quantity of consecutive image frames that have the first feature and that are in the second multimedia resource;

determine image frames having the first feature in the second multimedia resource whose quantity of consecutive image frames having the first feature falls within a target quantity threshold range as the first target image frames meeting the target condition; and determine the media resources to which the first target image frames meeting the target condition belong as the first media resource set.

Optionally, in this embodiment, the first determining unit is further configured to: train a classification network model by using a plurality of multimedia resource samples and similarity data, to obtain a target classification network model, the similarity data being data used for indicating similarities among the plurality of multimedia resource samples, a loss function of the classification network model being set to a contrastive loss function, input parameters of the target classification network model being image frames of multimedia resources, and output parameters of the target classification network model being features corresponding to the image frames of the multimedia resources; and input the image frames of the to-be-matched multimedia resource into the target classification network model, to obtain the first feature outputted by the target classification network model.

Optionally, in this embodiment, the classification network model may include, but is not limited to: the VGGNet, the GoogleNet, the ResNet, and the like.

In an optional solution, the first determining module is configured to: extract second features from the first target image frames, and extract third features from the image frames of the to-be-matched multimedia resource; obtain correspondences between the first target image frames and the image frames of the to-be-matched multimedia resource; for the first target frame image and the frame image of the to-be-matched multimedia resource that have the correspondence, obtain a quantity of matched features and a quantity of mutually unmatched features in the second features of the first target frame image and the third features of the frame image of the to-be-matched multimedia resource; obtain a ratio of the quantity of the matched features to the quantity of the mutually unmatched features; and determine the first target frame image corresponding to the ratio falling within a first ratio range as the second target frame image, the frame image corresponding to the ratio falling within the first ratio range being a frame image whose features match the features in the frame image of the to-be-matched multimedia resource and meet the second matching condition.

In an optional implementation, for a first target frame image and a frame image of the to-be-matched multimedia resource that have a correspondence, if second features of the first target frame image having the correspondence include: S1, S2, S3, S4, S5, S6, S7, S8, S9, and S10, and third features of the frame image of the to-be-matched multimedia resource include: S1, S2, S3, S4, S5, S6, S7, S8, S9, and S11, matched features between the second features of the first target frame image and the third features of the frame image of the to-be-matched multimedia resource are S1, S2, S3, S4, S5, S6, S7, S8, and S9, and a quantity of the matched features is 9; mutually unmatched features between the second features of the first target frame image and the third features of the frame image of the to-be-matched multimedia resource are S1, S2, S3, S4, S5, S6, S7, S8, S9, S10, and S11, and a quantity of mutually unmatched features is 11, so that a ratio of the quantity of the matched features to the quantity of the mutually unmatched features is 9/11. Assuming that the first ratio range is being greater than 3/4, and the ratio 9/11 is greater than 3/4, then the first target frame image can be determined as a second target frame image.

In an optional solution, the first obtaining module includes:
 (1) a second obtaining unit, configured to obtain target media resources to which the second target image frames belong;
 (2) a second determining unit, configured to: for each of the target media resources, determine a quantity of second target image frames included in the target media resources and a frame rate value of the target media resource, the frame rate value being used for indicating a quantity of played image frames per second of the target media resource; and
 (3) a third determining unit, configured to determine a product of the quantity of the second target image frames included in the target media resource and the frame rate value of the target media resource as a total duration corresponding to the target media resource, and determine a playback time point of the second target image frames included in the target media resource in the target media resource as a playback moment corresponding to the target media resource.

Optionally, in this embodiment, a total duration of a matching part between the to-be-matched multimedia resource and a multimedia resource can be determined by using, for example, but not limited to, a quantity of second target image frames in the multimedia resource and a frame rate value of the multimedia resource.

Optionally, in this embodiment, a scaling relationship of matched parts in a multimedia resource is determined by, for example, but not limited to, constructing a mapping relationship between time points of a second target frame image and a to-be-matched frame image that have a correspondence. For example, a scaling relationship on a video matching time domain is estimated by constructing a time point mapping relationship of at1+bt2=c (t1 is a time point of an inputted video, and t2 is a time point of a matched video). Information of video time domain deformation is estimated by using a least squares error method.

In an optional solution, the apparatus further includes:
 (1) a second obtaining module, configured to obtain a ratio of the total duration to a duration of the target media resource; and
 (2) a second determining module, configured to determine, in a case that the ratio of the total duration to the duration of the target media resource falls within a second ratio range, that the to-be-matched multimedia resource infringes on a copyright of the target media resource, the target media resource being a multimedia resource having a copyright.

Optionally, in this embodiment, whether the to-be-matched multimedia resource infringes on a copyright may be determined according to the obtained matching information. For example, if a duration of a matching part between a to-be-matched video and a video in a video library exceeds 50% of a total duration of the video, it may be determined that the to-be-matched video infringes on a copyright of the video.

For an application environment of this embodiment of this application, reference may be made to, but not limited to, the application environment of the foregoing embodiment. This is not described in detail in this embodiment. This embodiment of this application provides an optional application example used for performing the foregoing multimedia resource matching method.

Figure 6:
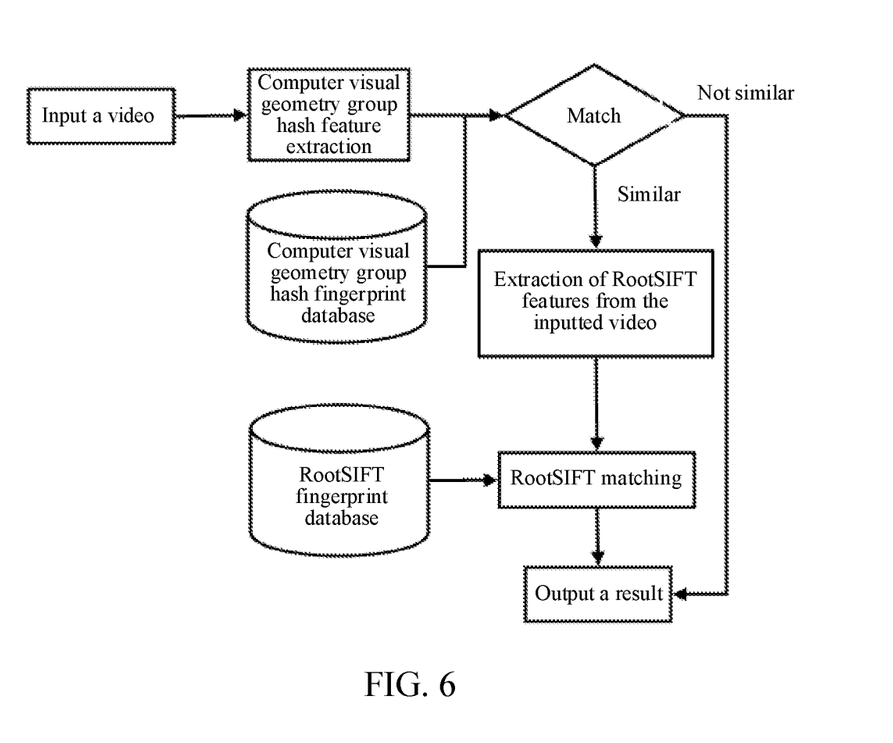
FIG. 6 is a schematic diagram of an application scenario of an optional multimedia resource matching method according to an embodiment of this application.

In an optional embodiment, the multimedia resource matching method may be applied to, but is not limited to, a scenario in which video resources are matched shown in FIG. 6. In this scenario, a process of matching videos includes two procedures of feature matching: a procedure of matching VGG hash features and a procedure of matching RootSIFT features. The VGG hash features are first used for performing similarity matching on videos (a VGG hash fingerprint database refers to a set of features of videos having copyrights). During the procedure of matching VGG features, if there is no similarity, a result is directly outputted; and if there is a similarity, secondary correction that is, RootSIFT feature matching, is performed. Through the RootSIFT feature matching, results obtained after correction are finally outputted in a unified manner.

Optionally, in this embodiment, video features are extracted in the following manner: a frame rate of an inputted video (equivalent to the to-be-matched multimedia resource) is first changed to K frames/s (for example, K is set to 3). Subsequently, two methods for extracting features, namely, feature extraction of deep learning and conventional feature extraction, are applied.

Optionally, in this embodiment, during feature extraction of deep learning, a conventional classification network (such as the VGGNet, the GoogleNet, and the ResNet) is used. Transfer learning is performed in a pre-trained classification network (for example, the VGGNet that performs classification on 1000 objects and that is obtained through training by using a disclosed dataset imageNet). A similar data set of a batch of pictures is collected, and a final loss layer of the VGGNet (the VGGNet is used as an example herein, and another network is also applicable) performing classification is changed into a contrastive loss, so that a similarity between two pictures may be measured. Subsequently, transfer learning is performed, to obtain a network capable of distinguishing similarities of pictures. Based on features extracted by the VGGNet, each picture only has one feature, and the feature is recorded as Fdt herein, where t represents a time point. The extracted feature is transformed into a hash feature value through median binarization (median cut), and is recorded as $D_t$.

Optionally, in this embodiment, during conventional feature extraction, a RootSIFT method is used. First, SIFT feature extraction is performed on extracted video frames, to obtain P features. Subsequently, a normalization operation is performed on the P features. Normalization may improve an anti-noise capability:

Original SIFT vector: $V_{sift}(v_1, v_2, \ldots, v_{128})$ $$V_{rootsift} = \sqrt{\left|V_{sift}/\sum_i^{128} v_i\right|}$$ Deformation formula The features after the normalization are transformed through median binarization (median cut), so that P hash values are obtained for each frame, and are recorded as $T_{t,i}$, where $i \in [0,P)$.

Optionally, in this embodiment, a process of matching video fingerprints is performed in the following manner: matching video fingerprints includes two processes: 1. VGG feature matching; 2. RootSIFT feature matching. The process is as follows: VGG feature matching is first performed on an inputted video, because features extracted by the VGGNet are relatively abstract and a quantity of hash feature values is relatively small. VGG feature matching is very suitable as the first video match filtering. VGG feature matching may have a very high recall rate. After the VGG feature matching, similarities of videos may be calculated. For videos having similarities greater than a threshold, RootSIFT matching analysis is used, to further determine matching information of the videos. The RootSIFT has relatively good detail descriptions, and can better ensure accuracy.

Optionally, in this embodiment, a process of VGG feature matching includes: fingerprint feature extraction, and hash transformation, and time domain matching analysis. Video fingerprint feature extraction is first performed on an inputted video, and then through median binarization, a succession of hash feature values and time points corresponding to the hash feature values. A fingerprint database stores features ($D_t$, videoID, t) of videos having copyrights, where t is a time point, and videoID is an ID number of a video. In addition, features of such a type are stored according to a data structure of an inverted table.

$[D_t]$: {$[t_j, videoID_k], [t_k, videoID_x] \ldots$}

$[D_{t+1}]$: {$[t_{j+n}, videoID_{k+h}], [t_k, videoID_x] \ldots$}

During matching, the inputted video is divided into a plurality of segments of Ks (herein K is set to 5), matching is individually performed for each of the segments. If there are three feature frames per second, when K is set to 5, a single segment has 15 hash values ($D_i$, $i \in [0,15)$) in total. Each $D_i$ is compared with features in a fingerprint database, to find information ($[t_j, videoID_k], [t_k, videoID_x] \ldots$) of a corresponding video having equal hash feature values (for example, data having equal $D_t$), and then aggregation is performed according to $videoID_k$. A quantity of temporally consecutively matched image frames for $videoID_k$ is counted, and then, is divided by 15, to obtain a similarity. Video segments having similarities greater than 0.8 are selected as matched segments. According to the foregoing method, similarity calculation may be performed on segments of each Ks, and finally, a quantity R of similar segments between each video and the inputted video is obtained. A similarity of a video may be calculated by using the quantity of similar segments: MatchPer=100*R*K/dur, where dur is a duration of the matched video.

Optionally, in this embodiment, when a similarity MatchPer calculated in VGG feature matching is greater than a specific threshold (for example, Q, Q being set to 50), RootSIFT feature matching is performed. After the VGG feature matching, a videoID list of VGG matching may be obtained. During RootSIFT matching, calibration of secondary matching is performed on the inputted video and videoIDs of VGG matching. RootSIFT feature extraction is first performed on the inputted video, and RootSIFT features of videos of VGG matching are read from the fingerprint database.

A policy of matching every two videos is used during the matching procedure, that is, the inputted video is matched with videos in the videoID list one by one, to find matching information. Herein, a similarity of each frame image is calculated in the following manner:

$S_{T_{t1}, T'_{t2}} = T_{t1} \cap T'_{t2} / T_{t1} \cup T'_{t2}$ where S is a similarity, $T_{t1}$ is video features of the inputted video at a time t1, and $T'_{t2}$ is video features of a video of the videoID list at a time t2; $\cap$ describes a quantity of similar features between the two videos, and $\cup$ describes a total quantity of features of different hash types in the features of two videos; and $S_{T_i T'_j}$ describes a similarity between the two videos. If $S_{T_{t1}, T'_{t2}}$ is less than a threshold E (for example, E is set to 0.011), a video frame $T_{t1}$ matches a video frame $T'_{t2}$, and matching time information (t1, t2) is recorded.

During a procedure of matching every two videos, information of matching time points between two videos is obtained. A scaling relationship between two videos on a matching time domain is estimated by constructing a time point mapping relationship of at1+bt2=c (t1 is a time point of the inputted video, and t2 is a time point of a matched video). Information of video time domain deformation is estimated by using a least squares error method. Finally, matching time points are analyzed to obtain a matching duration. A matching percentage of a video may be calculated according to a matching duration and a duration of the inputted video (calculation of the percentage may be adjusted according to related service logic). Matching of the video is finally determined by using the percentage or information of the matching duration. During RootSIFT secondary matching, matching is sequentially performed on every two videos in the videos of the videoID list. Matching results (including matching time points, matching durations, and the like) are finally outputted.

In the foregoing manner, originality of videos made by excellent users can be protected, to provide originality protection for users; and advertisement revenue may be provided. Some excellent video makers are encouraged to provide more excellent contents to a platform. In addition, copyright protection is further provided for copyrights of films, television dramas, variety shows, and the like.

On the other hand, the manner may also be applied to detecting repeated videos. Not only stored videos of a video platform can be purified, to improve video quality of the platform, but also recommended videos can be filtered during a recommendation made by an application.

Figure 7:
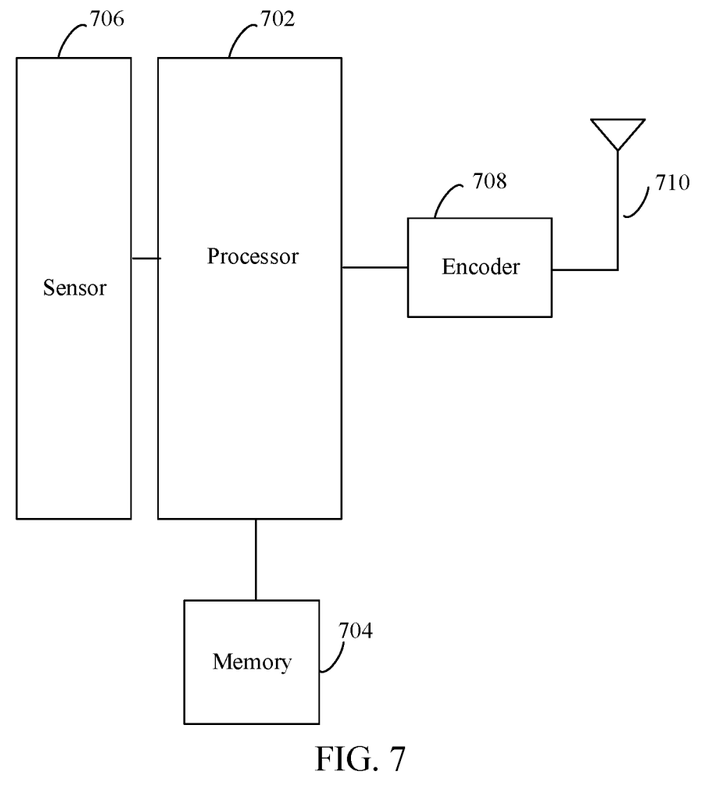
FIG. 7 is a schematic diagram of an optional electronic apparatus according to an embodiment of this application.

According to still another aspect of the embodiments of this application, an electronic apparatus configured to perform the foregoing multimedia resource matching is further provided. As shown in FIG. 7, the electronic apparatus includes: one or more (only one is shown is the figure)

processors 702, a memory 704, a sensor 706, an encoder 708, and a transmission apparatus 710, the memory storing a computer program, and the processor being configured to perform the steps in any one of the foregoing method embodiments by using the computer program.

Optionally, in this embodiment, the electronic apparatus may be located in at least one of a plurality of network devices in a computer network.

Optionally, in this embodiment, the processor may be configured to perform the following steps by using the computer program:

S1: Search a multimedia resource set for a first media resource set, first target image frames of all media resources in the first media resource set meeting a target condition, and features of the first target image frames matching features in image frames of a to-be-matched multimedia resource and meeting a first matching condition.

S2: Determine second target image frames in the first target image frames, features of the second target image frames matching the features in the image frames of the to-be-matched multimedia resource and meeting a second matching condition.

S3: Obtain matching information of the second target image frames, the matching information being used for indicating a total duration and a playback moment of the second target frame image in a target media resource, and the target media resource being a media resource to which the second target frame image belongs.

Optionally, a person of ordinary skill in the art may understand that, the structure shown in FIG. 7 is only illustrative. The electronic apparatus may also be a terminal device such as a smartphone (such as an Android mobile phone or an iOS mobile phone), a tablet computer, a palmtop computer, a mobile Internet device (MID), or a PAD. FIG. 7 does not constitute a limitation on a structure of the foregoing electronic apparatus. For example, the electronic apparatus may alternatively include more or fewer components (such as a network interface and a display apparatus) than those shown in FIG. 7, or has a configuration different from that shown in FIG. 7.

The memory 702 may be configured to store a software program and module, for example, a program instruction/module corresponding to the multimedia resource matching method and apparatus in the embodiments of this application. The processor 704 executes various functional applications and performs data processing by running the software program and module stored in the memory 702, that is, implements the foregoing multimedia resource matching method. The memory 702 may include a high speed random access memory, and may alternatively include a non-volatile memory, for example, one or more magnetic storage apparatuses, a flash memory, or another non-volatile solid-state memory. In some embodiments, the memory 702 may further include memories remotely disposed relative to the processor 704, and the remote memories may be connected to a terminal by using a network. Examples of the network include but are not limited to, the Internet, an intranet, a local area network, a mobile communications network, and a combination thereof.

The transmission apparatus 710 is configured to receive or transmit data by using a network. Optional examples of the network may include a wired network and a wireless network. In an example, the transmission apparatus 710 includes a network interface controller (NIC), which may be connected to another network device and router by using a cable, to communicate with the Internet or a local area network. In an example, the transmission apparatus 710 is a radio frequency (RF) module, and is configured to wirelessly communicate with the Internet.

Optionally, the memory 702 is configured to store an application program.

The embodiments of this application further provide a storage medium. The storage medium stores a computer program, the computer program being configured to perform, when run, steps in any one of the foregoing method embodiments.

Optionally, in this embodiment, the storage medium may be configured to store a computer program used for performing the following steps:

S1: Search a multimedia resource set for a first media resource set, first target image frames of all media resources in the first media resource set meeting a target condition, and features of the first target image frames matching features in image frames of a to-be-matched multimedia resource and meeting a first matching condition.

S2: Determine second target image frames in the first target image frames, features of the second target image frames matching the features in the image frames of the to-be-matched multimedia resource and meeting a second matching condition.

S3: Obtain matching information of the second target image frames, the matching information being used for indicating a total duration and a playback moment of the second target frame image in a target media resource, and the target media resource being a media resource to which the second target frame image belongs.

Optionally, the storage medium is further configured to store a computer program configured to perform the steps included in the method in the foregoing embodiments. Details are not described again in this embodiment.

Optionally, in this embodiment, a person of ordinary skill in the art may understand that all or some of the steps of the methods in the embodiments may be implemented by a program by instructing hardware relevant to a terminal device. The program may be stored in a computer-readable storage medium, and the storage medium may include a flash drive, a ROM, a RAM, a magnetic disk, an optical disc, and the like.

The sequence numbers of the foregoing embodiments of this application are merely for description purpose and do not indicate the preference of the embodiments.

When the integrated unit in the foregoing embodiments is implemented in the form of a software functional unit and sold or used as an independent product, the integrated unit may be stored in the foregoing computer-readable storage medium. Based on such an understanding, the technical solutions of this application essentially, or the part contributing to the related technology, or all or some of the technical solutions may be implemented in a form of a software product. The computer software product is stored in a storage medium and includes several instructions for instructing one or more computer devices (which may be a personal computer, a server, a network device, and the like) to perform all or some of the steps of the methods in the embodiments of this application.

In the foregoing embodiments of this application, the descriptions of the embodiments have their respective focuses. For a part that is not described in detail in an embodiment, reference may be made to the relevant descriptions of the other embodiments.

In the several embodiments provided in this application, it is to be understood that the disclosed client may be implemented in other manners. The described apparatus embodiment is merely exemplary. For example, the unit division is merely logical function division and may be another division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the units or modules may be implemented in electronic or another form.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in the form of hardware, or may be implemented in the form of a software function unit.

The foregoing descriptions are merely exemplary implementations of this application. A person of ordinary skill in the art may further make several improvements and refinements without departing from the principle of this application, and the improvements and refinements shall fall within the protection scope of this application.

What is claimed is:

1. A multimedia resource matching method performed at a computing device having one or more processors and memory storing a plurality of programs to be executed by the one or more processors, comprising:
   identifying, among a multimedia resource set, wherein the multimedia resource set includes a plurality of candidate videos, each candidate video having multiple video segments, a first media resource set matching a to-be-matched multimedia resource, wherein the to-be-matched multimedia resource includes a target video having multiple video segments, wherein features of a respective video segment of a candidate video of media resources in the first media resource set match features of a corresponding video segment of the target video of the to-be-matched multimedia resource according to a first matching condition at a video-segment level, wherein a similarity between the candidate video and the target video, which is dependent upon a number of matched video segments within the candidate video and the target video, is greater than a predefined threshold;
   determining, among first target image frames of a respective video segment of each candidate video in the first media resource set, second target image frames whose features match the features in the image frames of a corresponding video segment of the target video of the to-be-matched multimedia resource according to a second matching condition at an image frame level; and
   obtaining matching information of the second target image frames within a target media resource among the multimedia resource set, the matching information being used for indicating (i) a total duration of the second target image frames within the target media resource and (ii) a playback moment of a first one of the second target frame images in the target media resource.

2. The method according to claim 1, wherein the identifying, among a multimedia resource set, a first media resource set matching a to-be-matched multimedia resource comprises:
   determining, among image frames of a respective video segment of the candidate video of multimedia resources in the multimedia resource set, the first target image frames meeting the first matching condition at the video-segment level; and
   obtaining first multimedia resources to which the first target image frames belong as the first media resource set.

3. The method according to claim 2, wherein the determining, among image frames of a respective video segment of the candidate video of multimedia resources in the multimedia resource set, the first target image frames meeting the first matching condition at the video-segment level comprises:
   extracting a first feature from the image frames of the corresponding video segment of the target video of the to-be-matched multimedia resource;
   obtaining, from frame image sets that have correspondence to the first feature, a target frame image set corresponding to the first feature, the target frame image set comprising image frames that are in the respective video segment of the candidate video of multimedia resources of the first media resource set and that have the first feature, and features of the image frames in the target frame image set matching the features in the image frames of the to-be-matched multimedia resource according to the first matching condition at the video-segment level;
   obtaining, from the first media resource set, at least one second multimedia resource including the respective video segment of the candidate video to which the image frames in the target frame image set belong;
   obtaining a quantity of consecutive video segments within the candidate video in the at least one second multimedia resource that have the first feature; and
   selecting, among the at least one second multimedia resource, media resources having candidate videos whose quantity of consecutive video segments having the first feature at the video-segment level falls within a target quantity threshold range as the first media resource set.

4. The method according to claim 3, wherein the extracting a first feature from the image frames of the corresponding video segment of the target video of the to-be-matched multimedia resource comprises:
   training a classification network model by using a plurality of multimedia resource samples and similarity data, to obtain a target classification network model, the similarity data being data used for indicating similarities among the plurality of multimedia resource samples, a loss function of the classification network model being set to a contrastive loss function, input parameters of the target classification network model being image frames of multimedia resources, and output parameters of the target classification network model being features corresponding to the image frames of the multimedia resources; and
   inputting the image frames of the corresponding video segment of the target video of the to-be-matched multimedia resource into the target classification network model, to obtain the first feature outputted by the target classification network model.

5. The method according to claim 1, wherein the determining, among first target image frames of a respective video segment of each candidate video in the first media resource set, second target image frames whose features match the features in the image frames of a corresponding video segment of the target video of the to-be-matched multimedia resource according to a second matching condition at an image frame level comprises:
- extracting second features from the first target image frames of a respective video segment of each candidate video in the first media resource set, and extracting third features from the image frames of a corresponding video segment of the target video of the to-be-matched multimedia resource;
- obtaining correspondences between the first target image frames of a respective video segment of each candidate video in the first media resource set and the image frames of a corresponding video segment of the target video of the to-be-matched multimedia resource at the image frame level;
- for the first target frame image of a respective video segment of each candidate video in the first media resource set and the frame image of a corresponding video segment of the target video of the to-be-matched multimedia resource that have the correspondence at the image frame level, obtaining a quantity of matched features and a quantity of mutually unmatched features in the second features of the first target frame image and the third features of the frame image of the to-be-matched multimedia resource at the image frame level;
- obtaining a ratio of the quantity of the matched features to the quantity of the mutually unmatched features for the first target frame image at the image frame level; and
- selecting the first target frame image as the second target frame image when the ratio of the first target frame image falls within a first ratio range according to the second matching condition at the image frame level.

6. The method according to claim 1, wherein the obtaining matching information of the second target image frames comprises:
- obtaining target media resources to which the second target image frames belong;
- for each of the target media resources, determining a quantity of second target image frames comprised in the target media resource and a frame rate value of the target media resource, the frame rate value being used for indicating a quantity of played image frames per second of the target media resource; and
- determining a product of the quantity of the second target image frames comprised in the target media resource and the frame rate value of the target media resource as a total duration corresponding to the target media resource, and determining a playback time point of the second target image frames comprised in the target media resource in the target media resource as a playback moment corresponding to the target media resource.

7. The method according to claim 1, further comprising:
- obtaining a ratio of the total duration to a duration of the target media resource at video level; and
- identifying the to-be-matched multimedia resource as being similar to the target media resource, in a case that the ratio of the total duration to the duration of the target media resource at the video level falls within a second ratio range.

8. A computing device, comprising:
one or more processors;
memory; and
a plurality of programs that, when executed by the one or more processors, cause the computing device to perform a plurality of operations including:
- identifying, among a multimedia resource set, wherein the multimedia resource set includes a plurality of candidate videos, each candidate video having multiple video segments, a first media resource set matching a to-be-matched multimedia resource, wherein the to-be-matched multimedia resource includes a target video having multiple video segments, wherein features of first target image frames of a respective video segment of a candidate video of media resources in the first media resource set match features in the image frames of a corresponding video segment of the target video of the to-be-matched multimedia resource according to a first matching condition at a video-segment level, wherein a similarity between the candidate video and the target video, which is dependent upon a number of matched video segments within the candidate video and the target video, is greater than a predefined threshold;
- determining, among the first target image frames of a respective video segment of each candidate video in the first media resource set, second target image frames whose features match the features in the image frames of a corresponding video segment of the target video of the to-be-matched multimedia resource according to a second matching condition at an image frame level; and
- obtaining matching information of the second target image frames within a target media resource among the multimedia resource set, the matching information being used for indicating (i) a total duration of the second target image frames within the target media resource and (ii) a playback moment of a first one of the second target frame images in the target media resource.

9. The computing device according to claim 8, wherein the identifying, among a multimedia resource set, a first media resource set matching a to-be-matched multimedia resource comprises:
- determining, among image frames of a respective video segment of the candidate video of multimedia resources in the multimedia resource set, the first target image frames meeting the first matching condition at the video-segment level; and
- obtaining first multimedia resources to which the first target image frames belong as the first media resource set.

10. The computing device according to claim 9, wherein the determining, among image frames of a respective video segment of the candidate video of multimedia resources in the multimedia resource set, the first target image frames meeting the first matching condition at the video-segment level comprises:
- extracting a first feature from the image frames of the corresponding video segment of the target video of the to-be-matched multimedia resource;
- obtaining, from frame image sets that have correspondence to the first feature, a target frame image set corresponding to the first feature, the target frame image set comprising image frames that are in the respective video segment of the candidate video of multimedia resources of the first media resource set and that have the first feature, and features of the image frames in the target frame image set matching the features in the image frames of the to-be-matched multimedia resource according to the first matching condition at the video-segment level;

obtaining, from the first media resource set, at least one second multimedia resource including the respective video segment of the candidate video to which the image frames in the target frame image set belong;

obtaining a quantity of consecutive video segments within the candidate video in the at least one second multimedia resource that have the first feature; and selecting, among the at least one second multimedia resource, media resources having candidate videos whose quantity of consecutive video segments having the first feature at the video-segment level falls within a target quantity threshold range as the first media resource set.

11. The computing device according to claim 10, wherein the extracting a first feature from the image frames of the corresponding video segment of the target video of the to-be-matched multimedia resource comprises:

training a classification network model by using a plurality of multimedia resource samples and similarity data, to obtain a target classification network model, the similarity data being data used for indicating similarities among the plurality of multimedia resource samples, a loss function of the classification network model being set to a contrastive loss function, input parameters of the target classification network model being image frames of multimedia resources, and output parameters of the target classification network model being features corresponding to the image frames of the multimedia resources; and inputting the image frames of the corresponding video segment of the target video of the to-be-matched multimedia resource into the target classification network model, to obtain the first feature outputted by the target classification network model.

12. The computing device according to claim 8, wherein the determining, among When first target image frames of a respective video segment of each candidate video in the first media resource set, second target image frames whose features match the features in the image frames of a corresponding video segment of the target video of the to-be-matched multimedia resource according to a second matching condition at an image frame level comprises:

extracting second features from the first target image frames of a respective video segment of each candidate video in the first media resource set, and extracting third features from the image frames of a corresponding video segment of the target video of the to-be-matched multimedia resource;

obtaining correspondences between the first target image frames of a respective video segment of each candidate video in the first media resource set and the image frames of a corresponding video segment of the target video of the to-be-matched multimedia resource at the image frame level;

for the first target frame image of a respective video segment of each candidate video in the first media resource set and the frame image of a corresponding video segment of the target video of the to-be-matched multimedia resource that have the correspondence at the image frame level, obtaining a quantity of matched features and a quantity of mutually unmatched features in the second features of the first target frame image and the third features of the frame image of the to-be-matched multimedia resource at the image frame level;

obtaining a ratio of the quantity of the matched features to the quantity of the mutually unmatched features for the first target frame image at the image frame level; and selecting the first target frame image as the second target frame image when the ratio of the first target frame image falls within a first ratio range according to the second matching condition at the image frame level.

13. The computing device according to claim 8, wherein the obtaining matching information of the second target image frames comprises:

obtaining target media resources to which the second target image frames belong;

for each of the target media resources, determining a quantity of second target image frames comprised in the target media resource and a frame rate value of the target media resource, the frame rate value being used for indicating a quantity of played image frames per second of the target media resource; and determining a product of the quantity of the second target image frames comprised in the target media resource and the frame rate value of the target media resource as a total duration corresponding to the target media resource, and determining a playback time point of the second target image frames comprised in the target media resource in the target media resource as a playback moment corresponding to the target media resource.

14. The computing device according to claim 8, wherein the plurality of operations further comprise:

obtaining a ratio of the total duration to a duration of the target media resource at video level; and identifying the to-be-matched multimedia resource as being similar to the target media resource, in a case that the ratio of the total duration to the duration of the target media resource at the video level falls within a second ratio range.

15. A non-transitory computer-readable storage medium storing at least one instruction, the instruction being loaded and executed by a processor of a computing device and causing the computing device to perform a plurality of operations including:

identifying, among a multimedia resource set, wherein the multimedia resource set includes a plurality of candidate videos, each candidate video having multiple video segments, a first media resource set matching a to-be-matched multimedia resource, wherein the to-be-matched multimedia resource includes a target video having multiple video segments, wherein features of first target image frames of a respective video segment of a candidate video of media resources in the first media resource set match features in the image frames of a corresponding video segment of the target video of the to-be-matched multimedia resource according to a first matching condition at a video-segment level, wherein a similarity between the candidate video and the target video, which is dependent upon a number of matched video segments within the candidate video and the target video, is greater than a predefined threshold;

determining, among the first target image frames of a respective video segment of each candidate video in the first media resource set, second target image frames whose features match the features in the image frames of a corresponding video segment of the target video of the to-be-matched multimedia resource according to a second matching condition at an image frame level; and obtaining matching information of the second target image frames within a target media resource among the multimedia resource set, the matching information being used for indicating (i) a total duration of the second target image frames within the target media resource and (ii) a playback moment of a first one of the second target frame images in the target media resource.

16. The non-transitory computer-readable storage medium according to claim 15, wherein the identifying, among a multimedia resource set, a first media resource set matching a to-be-matched multimedia resource comprises:
   determining, among image frames of a respective video segment of the candidate video of multimedia resources in the multimedia resource set, the first target image frames meeting the first matching condition at the video-segment level; and
   obtaining first multimedia resources to which the first target image frames belong as the first media resource set.

17. The non-transitory computer-readable storage medium according to claim 16, wherein the determining, among image frames of a respective video segment of the candidate video of multimedia resources in the multimedia resource set, the first target image frames meeting the first matching condition at the video-segment level comprises:
   extracting a first feature from the image frames of the corresponding video segment of the target video of the to-be-matched multimedia resource;
   obtaining, from frame image sets that have correspondence to the first feature, a target frame image set corresponding to the first feature, the target frame image set comprising image frames that are in the respective video segment of the candidate video of multimedia resources of the first media resource set and that have the first feature, and features of the image frames in the target frame image set matching the features in the image frames of the to-be-matched multimedia resource according to the first matching condition at the video-segment level;
   obtaining, from the first media resource set, at least one second multimedia resource including the respective video segment of the candidate video to which the image frames in the target frame image set belong;
   obtaining a quantity of consecutive video segments within the candidate video in the at least one second multimedia resource that have the first feature; and
   selecting, among the at least one second multimedia resource, media resources having candidate videos whose quantity of consecutive video segments having the first feature at the video-segment level falls within a target quantity threshold range as the first media resource set.

18. The non-transitory computer-readable storage medium according to claim 15, wherein the determining, among first target image frames of a respective video segment of each candidate video in the first media resource set, second target image frames whose features match the features in the image frames of a corresponding video segment of the target video of the to-be-matched multimedia resource according to a second matching condition at an image frame level comprises:
   extracting second features from the first target image frames of a respective video segment of each candidate video in the first media resource set, and extracting third features from the image frames of a corresponding video segment of the target video of the to-be-matched multimedia resource;
   obtaining correspondences between the first target image frames of a respective video segment of each candidate video in the first media resource set and the image frames of a corresponding video segment of the target video of the to-be-matched multimedia resource at the image frame level;
   for the first target frame image of a respective video segment of each candidate video in the first media resource set and the frame image of a corresponding video segment of the target video of the to-be-matched multimedia resource that have the correspondence at the image frame level, obtaining a quantity of matched features and a quantity of mutually unmatched features in the second features of the first target frame image and the third features of the frame image of the to-be-matched multimedia resource at the image frame level;
   obtaining a ratio of the quantity of the matched features to the quantity of the mutually unmatched features for the first target frame image at the image frame level; and
   selecting the first target frame image as the second target frame image when the ratio of the first target frame image falls within a first ratio range according to the second matching condition at the image frame level.

19. The non-transitory computer-readable storage medium according to claim 15, wherein the obtaining matching information of the second target image frames comprises:
   obtaining target media resources to which the second target image frames belong;
   for each of the target media resources, determining a quantity of second target image frames comprised in the target media resource and a frame rate value of the target media resource, the frame rate value being used for indicating a quantity of played image frames per second of the target media resource; and
   determining a product of the quantity of the second target image frames comprised in the target media resource and the frame rate value of the target media resource as a total duration corresponding to the target media resource, and determining a playback time point of the second target image frames comprised in the target media resource in the target media resource as a playback moment corresponding to the target media resource.

20. The non-transitory computer-readable storage medium according to claim 15, wherein the plurality of operations further comprise:
   obtaining a ratio of the total duration to a duration of the target media resource at video level; and
   identifying the to-be-matched multimedia resource as being similar to the target media resource, in a case that the ratio of the total duration to the duration of the target media resource at the video level falls within a second ratio range.

* * * * *